United States Patent
Rime et al.

(10) Patent No.: US 9,237,263 B2
(45) Date of Patent: Jan. 12, 2016

(54) ANNOTATION METHOD AND APPARATUS

(71) Applicant: VIDINOTI SA, Fribourg (CH)

(72) Inventors: Laurent Rime, Fribourg (CH); Mathieu Monney, Lausanne (CH); Serge Ayer, Farvagny (CH); Martin Vetterli, Grandvaux (CH)

(73) Assignee: Vidinoti SA (CH)

( * ) Notice: Subject to any disclaimer, the term of this patent is extended or adjusted under 35 U.S.C. 154(b) by 452 days.

(21) Appl. No.: 13/645,762

(22) Filed: Oct. 5, 2012

(65) Prior Publication Data

US 2014/0098191 A1    Apr. 10, 2014

(51) Int. Cl.
*H04N 5/77* (2006.01)
*H04N 5/225* (2006.01)

(52) U.S. Cl.
CPC .................................. *H04N 5/2254* (2013.01)

(58) Field of Classification Search
CPC ...... H04N 5/2254; H04N 13/02; H04N 5/222
USPC ........................................................... 348/46
See application file for complete search history.

(56) References Cited

U.S. PATENT DOCUMENTS

| | | | | |
|---|---|---|---|---|
| 5,076,687 | A * | 12/1991 | Adelson | 356/4.04 |
| 6,097,394 | A * | 8/2000 | Levoy et al. | 345/419 |
| 6,996,251 | B2 * | 2/2006 | Malone et al. | 382/100 |
| 7,421,125 | B1 * | 9/2008 | Rees | 382/181 |
| 7,551,780 | B2 * | 6/2009 | Nudd et al. | 382/190 |
| 8,644,596 | B1 * | 2/2014 | Wu et al. | 382/154 |
| 2002/0106135 | A1 * | 8/2002 | Iwane | 382/305 |
| 2005/0232512 | A1 * | 10/2005 | Luk et al. | 382/276 |
| 2006/0251292 | A1 * | 11/2006 | Gokturk et al. | 382/103 |
| 2006/0251338 | A1 * | 11/2006 | Gokturk et al. | 382/305 |
| 2006/0251339 | A1 * | 11/2006 | Gokturk et al. | 382/305 |
| 2006/0253491 | A1 * | 11/2006 | Gokturk et al. | 707/104.1 |
| 2006/0262184 | A1 * | 11/2006 | Peleg et al. | 348/36 |
| 2006/0262352 | A1 * | 11/2006 | Hull et al. | 358/1.18 |
| 2006/0262962 | A1 * | 11/2006 | Hull et al. | 382/103 |
| 2006/0262976 | A1 * | 11/2006 | Hart et al. | 382/190 |
| 2006/0285172 | A1 * | 12/2006 | Hull et al. | 358/448 |
| 2006/0285772 | A1 * | 12/2006 | Hull et al. | 382/305 |
| 2007/0047780 | A1 * | 3/2007 | Hull et al. | 382/124 |
| 2007/0047819 | A1 * | 3/2007 | Hull et al. | 382/190 |
| 2007/0050360 | A1 * | 3/2007 | Hull et al. | 707/6 |
| 2007/0050411 | A1 * | 3/2007 | Hull et al. | 707/104.1 |
| 2007/0050419 | A1 * | 3/2007 | Weyl et al. | 707/200 |
| 2007/0050712 | A1 * | 3/2007 | Hull et al. | 715/530 |
| 2007/0165904 | A1 * | 7/2007 | Nudd et al. | 382/100 |
| 2009/0005679 | A1 * | 1/2009 | Dala-Krishna | 600/437 |
| 2009/0080800 | A1 * | 3/2009 | Moraleda et al. | 382/276 |

(Continued)

FOREIGN PATENT DOCUMENTS

| | | |
|---|---|---|
| EP | 1246080 A2 | 10/2002 |
| EP | 2207113 A1 | 7/2010 |

(Continued)

*Primary Examiner* — Shan Elahi
(74) *Attorney, Agent, or Firm* — Blank Rome LLP

(57) ABSTRACT

The present invention relates to an annotating method including the steps of capturing (100) data representing a light field with a plenoptic image capture device (4); matching (101) the captured data with a corresponding reference data; retrieving an annotation associated with an element of the reference data (102); rendering (103) a view generated from the captured data and including at least one annotation.

35 Claims, 7 Drawing Sheets

(56) References Cited

U.S. PATENT DOCUMENTS

| | | | |
|---|---|---|---|
| 2009/0196510 A1* | 8/2009 | Gokturk et al. | 382/224 |
| 2009/0238334 A1* | 9/2009 | Brahme et al. | 378/41 |
| 2010/0046837 A1* | 2/2010 | Boughorbel | 382/173 |
| 2010/0220212 A1* | 9/2010 | Perlman et al. | 348/229.1 |
| 2011/0069189 A1* | 3/2011 | Venkataraman et al. | 348/218.1 |
| 2011/0122308 A1* | 5/2011 | Duparre | 348/340 |
| 2012/0056984 A1* | 3/2012 | Zhang et al. | 348/43 |
| 2012/0113108 A1* | 5/2012 | Dala-Krishna | 345/419 |
| 2012/0163704 A1* | 6/2012 | Chang et al. | 382/154 |
| 2012/0249831 A1* | 10/2012 | Porter | 348/231.3 |
| 2013/0076931 A1* | 3/2013 | Border et al. | 348/222.1 |
| 2013/0083021 A1* | 4/2013 | Cohen et al. | 345/420 |

FOREIGN PATENT DOCUMENTS

| | | |
|---|---|---|
| WO | WO-2005114476 A1 | 12/2005 |
| WO | WO-2012084362 A1 | 6/2012 |

* cited by examiner

ANNOTATION METHOD AND APPARATUS

FIELD OF THE INVENTION

The present invention concerns an annotation method for adding annotations to data corresponding to a scene.

BACKGROUND OF THE INVENTION

Rapid progress in the development of hand-held portable devices such as smartphones, palmtop computers, portable media players, personal-digital-assistant (PDA) devices and the like, has led to proposed inclusion of novel features and applications involving image processing. In such an application, namely image annotation or captioning, a user points a portable device towards a scene, e.g. a landscape, a building, a poster, or a painting in a museum, and the display shows the image together with superimposed information concerning the scene. Such information can include names, e.g. for mountains and habitations, people names, historical information for buildings, and commercial information such as advertising, e.g. a restaurant menu. An example of such a system is described in EP1246080 and in EP2207113.

Annotation information can be supplied to portable devices by servers in a wireless communication network. A corresponding functional configuration of a communication network with servers and portable devices here will be designated as an annotation system.

WO05114476 describes a mobile image-based information retrieval system including a mobile telephone and a remote recognition server. In this system, the image taken with the camera of the mobile phone is transmitted to a remote server where the recognition process is performed. This leads to high bandwidth needs for transmitting the image, and to a delay for computing the annotations in the server and transferring them back to the mobile phone.

Many annotation systems and methods include a step of comparing an image acquired by the annotating device with a set of reference images stored in a database. As actual viewing angle and lighting conditions can be different with respect to the images stored in the database, the comparison algorithm should remove the influence of these parameters.

A further, more sophisticated image annotation technique uses 3D reference models. Often, this involves a registration process, i.e. a process of spatially transforming a captured (or target) image to align with a reference 3D model. In the case of a building, for example, a 3D model of the object is stored in a reference database together with the details to be annotated. The 2D image acquired by the portable device is registered with this model, and if a match can be found, the object is recognized and the corresponding annotations are superimposed onto the 2D image.

Image annotation models based on 3D models have the advantage over 2D models of being less depending on the viewing angle. A single 3D model can be used as a reference for matching with a plurality of different 2D images captured from different locations and at different angles. However, building a collection of 3D models is a difficult and tedious process; this usually requires 3D or stereo cameras. Moreover, the process of registering 2D captured images with 3D models is time consuming.

It is therefore an aim of the present invention to solve or at least mitigate the above mentioned problems of existing augmented reality systems.

BRIEF SUMMARY OF THE INVENTION

According to the invention, these aims are achieved by way of a method comprising the steps of:
capturing data representing a light field with a plenoptic capture device;
executing program code for matching the captured data with corresponding reference data;
executing program code for retrieving an annotation associated with an element of said reference data;
executing program code for rendering a view generated from said captured data and including at least one annotation.

The invention is also achieved by way of an apparatus for capturing and annotating data corresponding to a scene, comprising:
a plenoptic camera for capturing data representing a light field;
a processor;
a display;
programme code for causing said processor to retrieve an annotation associated with an element of data captured with said camera and for rendering on said display a view generated from the captured data and including at least one annotation when said program code is executed.

The invention also provides an apparatus for determining annotations, comprising:
a processor;
a store;
program code for causing said processor to receive data representing a light field, to match said data with one reference data in said store, to determine an annotation associated with said reference data, and to send said annotation to a remote device when said program code is executed.

Plenoptic cameras are known as such, and available on the market at low cost. Unlike conventional cameras that simply capture a 2D projection of a scene on a sensor, plenoptic cameras capture data representing the light field, i.e. a matrix indicating not only the intensity of light on each pixel, but also the direction of light reaching this pixel/sub-image, or at least the intensity of light reaching each single sub-image from various directions.

Therefore, a plenoptic sensor generates data containing more information about the light that reaches each sub-image than a conventional 2D image data generated by a conventional 2D image sensor.

The data generated by a plenoptic sensor includes information about a scene which is not directly available from a conventional 3D sensor neither from a stereoscopic camera. Therefore, since more and different information is available, the process of matching the captured data with reference data is more reliable than conventional methods of matching a 2D image with a 2D or 3D model. It is intuitive that having more information on the captured scene could be beneficial in improving recognition performance, and improving the quality of registration.

The matching of data provided by a plenoptic camera with a model is also more robust than the matching of a 2D or 3D captured image data with a 3D model.

The matching of the data representing the light field and captured by the plenoptic sensor may include a step of projecting the light field data onto a 2D image, and matching this 2D image with a 2D or 3D reference model. Since different projections are possible (for example corresponding to different focus which could be selected during the rendering of a plenoptic image), this process results in an increased likelihood of matching. However, additional resources are required for computing this or those projections, and information about the captured scene is lost during the conversion, resulting in a less precise and slower matching.

Therefore, in one embodiment, the data captured by the plenoptic sensor is matched with reference data representing a reference light field. Advantageously, this matching is performed without any projection of the captured light field data onto a 2D image, and/or without any projection of the reference light field data onto a 2D image. Therefore, the matching occurs entirely in the plenoptic domain, without any loss of information due to the conversion onto a 2D or 3D image, and based not only on the brightness at each point of a scene, but also on the direction on light rays in the captured data and in the reference data.

The method may include a step of registering the captured light field data onto the reference light field data. This registration process aims at finding a geometrical relationship between the captured light field data and the different annotations to be displayed. For example, in the case of cartographic data, the goal of the registration process would be to find where the light field captured by the plenoptic sensor lies in a reference map in order to, later on, be able to overlay cartographic annotations at the right locations. By performing this registration process entirely in the plenoptic space, the entire information present in the data representing the light field is used, yielding to a more precise annotation of the scene.

The method may include a step of matching the captured light field data with reference light field data generated by a plenoptic sensor at a different position. The method may include a step of matching the captured light field data with reference light field data generated by a plenoptic sensor at a different distance. The method may include a step of matching the captured light field data with reference light field data generated by a plenoptic sensor of a different type or having a different number of pixels in each sub image.

By performing a registration of the captured light field data with a reference light field data, one exploits all the information present in the captured light field data to properly and precisely register it with the more complete information present in the reference light field data, so that an annotation of the scene can be done properly and precisely.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
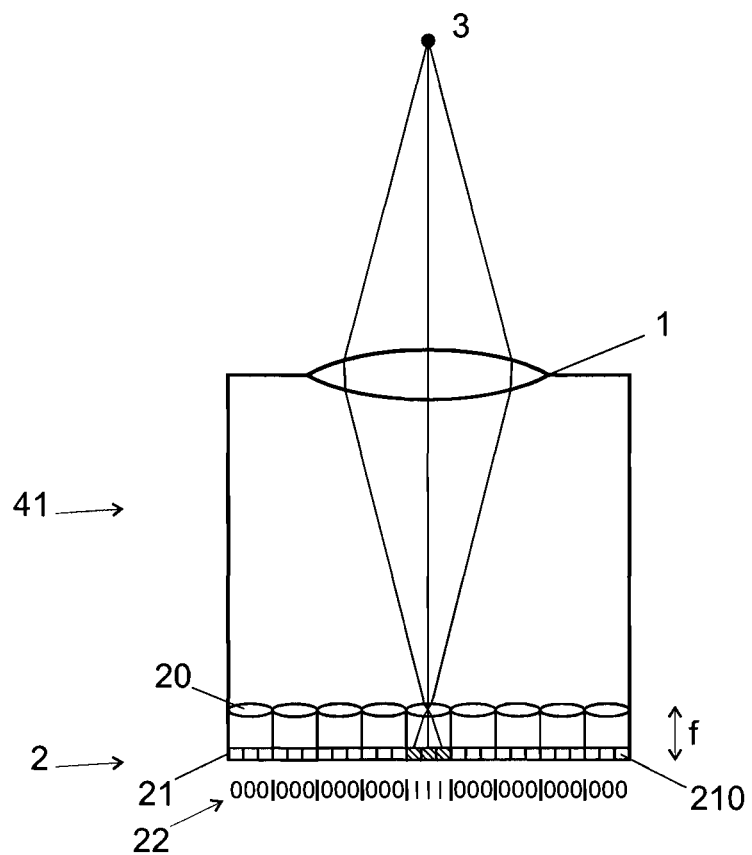
FIG. 1 schematically illustrates a plenoptic camera capturing data representing a light field of a scene with an object at a first distance.

Unlike conventional cameras that simply capture a 2D projection of a scene on a sensor, plenoptic sensors aim at capturing the complete light field present in a given scene. A complete light field may comprise 7 parameters for each pixel: 3 for the position, 2 for the direction, 1 for the wavelength and 1 for the time.

Plenoptic sensors generate data representing a so-called plenoptic light field, i.e., a matrix from which at least four of these parameters may be computed: the 2D position and the 2D direction of the rays hitting each pixel of the plenoptic sensor. We will sometimes refer to this data as the "light field data".

As of today, at least two companies propose plenoptic sensors that can record such a plenoptic light fields: Lytro and Raytrix. Their two cameras are slightly different in terms of design, but the main idea is to decompose the different directions of the light that is supposed to fall on a single photosite (or pixel) in a standard camera sensor. To that aim, as illustrated on FIG. 1, an array of micro-lenses 20 is placed behind the main lens 1, in place of the sensor of conventional cameras. The image sensor 21 is moved backward.

That way, the micro-lenses 21 redirect the light rays according to their incident angle and the redirected light rays reach different pixels 210 of the sensor 21. The amount of light measured by each of the N×M pixels 210 making a sub image depends on the direction of the light beams that hit the micro-lens 20 in front of that sub image.

Figure 2:
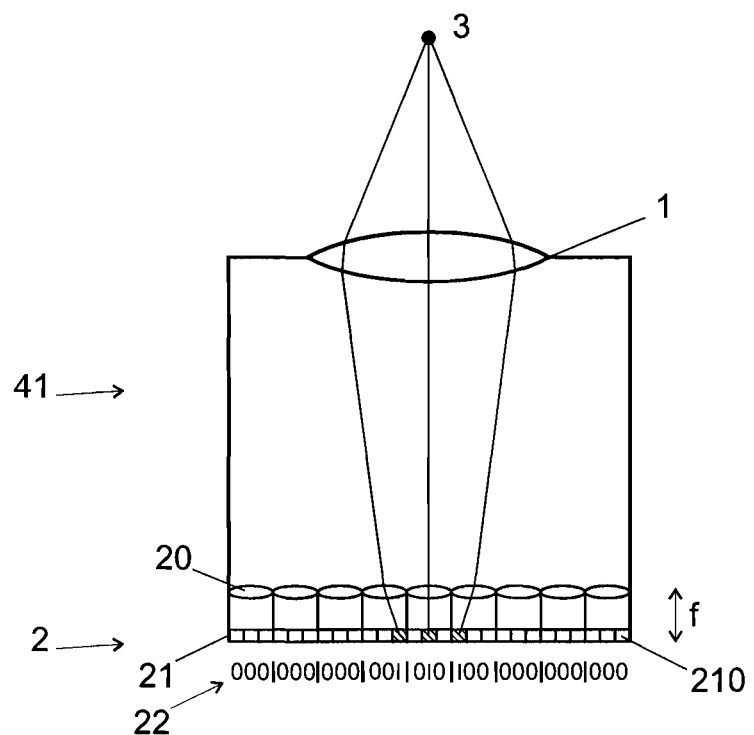
FIG. 2 schematically illustrates a plenoptic camera capturing data representing a light field of a scene with an object at a second distance.
Figure 3:
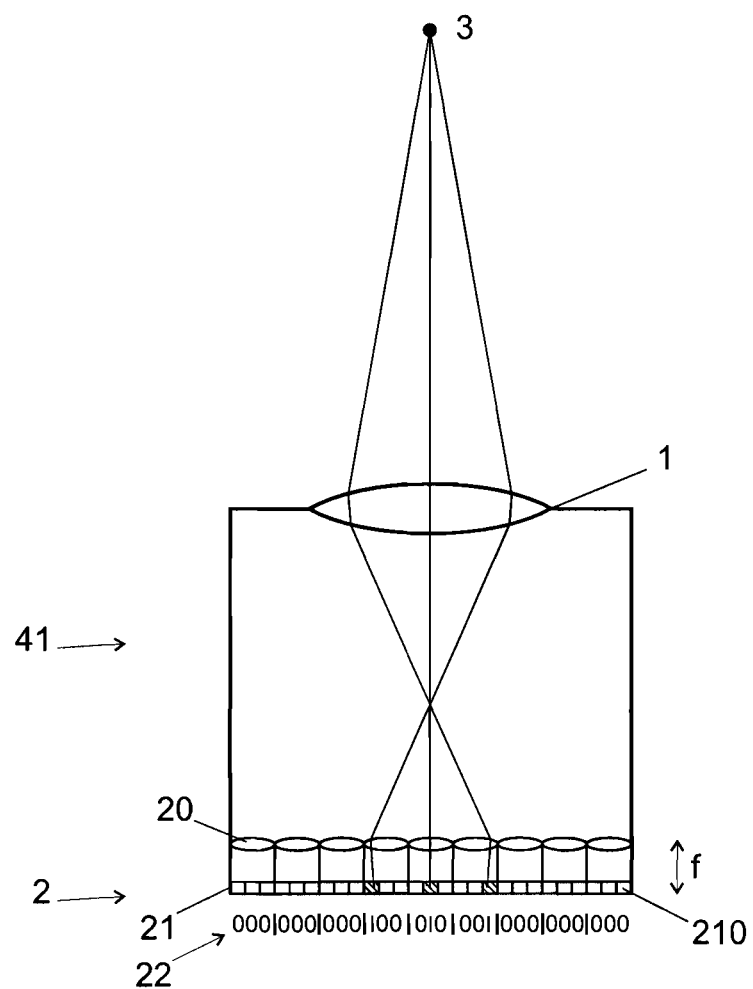
FIG. 3 schematically illustrates a plenoptic camera capturing data representing a light field of a scene with an object at a third distance.

FIGS. 1-3 illustrate a simple one-dimensional sensor comprising n=9 sub images, each sub image having one row of N×M pixels (or photosites) 210, N being equal to 3 and M to 1 in this example. Many plenoptic sensors have a higher number of sub-images and a higher number of pixels for each sub image, for example 9×9 pixels, allowing to distinguish between N×M=81 different orientations of light on the micro-lens 20. Assuming that all objects of the scene are in focus, each sub image thus includes a patch of brightness values indicating the amount of light coming from various directions onto that sub-image.

In this construction, the array of micro-lenses 20 is located on the image plane formed by the main lens 1 of the camera, and the sensor 21 is located at a distance f from the micro-lenses, where f is the focal length of the micro-lenses. This design allows a high angular resolution but suffers from relatively poor spatial resolution (the effective number of pixels per rendered image is equal to the number of micro-lenses). This problem is addressed by other plenoptic cameras where the micro-lenses focus on the image plane of the main lens, thus creating a gap between the micro-lenses and the image plane. The price to pay in such a design is poorer angular resolution.

As can be observed on FIGS. 1 to 3, the plenoptic light field corresponding to a scene with a single point 3 in this example depends on the distance from the point 3 to the main lens 1. On FIG. 1, all the light beams from this object reach the same micro-lens 20, thus resulting in a plenoptic light field where all the pixels in the sub-image corresponding to this micro-lens record a first positive light intensity while all other pixels corresponding to other lenses record a different, null light intensity. On FIG. 2, where the object 3 is closer to the lens 1, some light beams originating from the point 3 reach pixels of other sub images, i.e., sub images associated with two micro-lenses adjacent to the previously hit micro-lens. On FIG. 3, where the object 3 is at a greater distance from the lens 1, some light beams originating from the point 3 reach different pixels associated with two micro-lenses adjacent to the previously hit micro-lens. Therefore, the digital data 22 delivered by the sensor 21 depends on the distance to the object 3.

The plenoptic sensor 21 thus delivers light field data 22 containing, for each sub image corresponding to a micro-lens 20, a set of N×M values indicating the amount of light coming from various directions on the lens above this sub image. For a given focused object point, each pixel of a sub image corresponds to the intensity measure of a light ray hitting the sensor with a certain incidence angle The interests of knowing the direction of the light rays are multiple. By carefully rearranging the rays, one can, among other tasks, perform refocusing (change the object that is in focus in the scene), or change the viewpoint of the camera.

Figure 4:
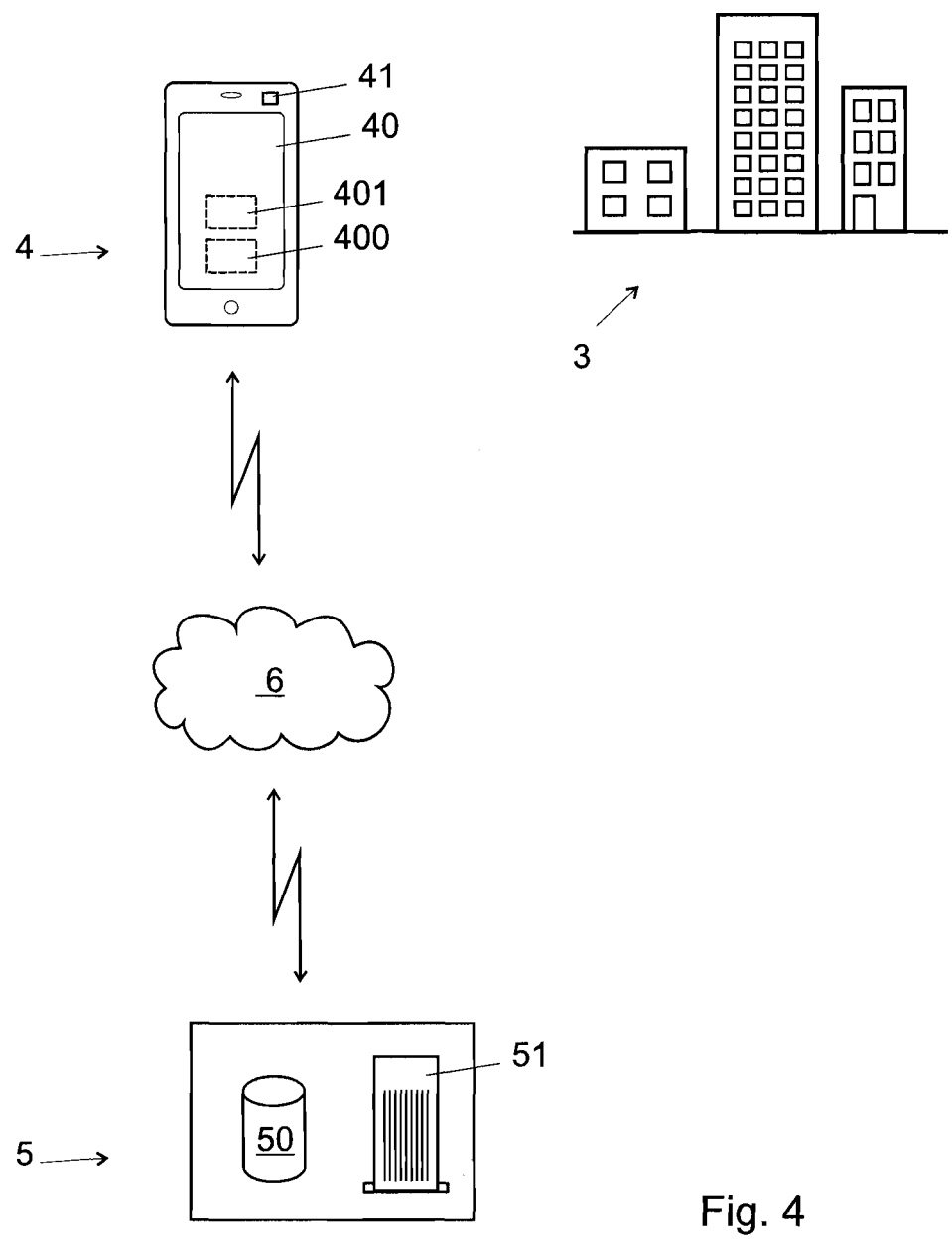
FIG. 4 schematically illustrates a system comprising various apparatus elements that together embody the invention.

FIG. 4 schematically illustrates a block diagram of an annotation system embodying the invention. The system comprises a user device 4, such as a hand-held device, a smartphone, a tablet, a camera, glasses, goggles, etc. The device 4 includes a plenoptic camera 41 such as the camera illustrated in FIGS. 1 to 3, for capturing data representing a light field on a scene 3, a processor such as a microprocessor 400 with a suitable program code, and a communication module 401 such as a WIFI and/or cellular interface for connecting the device 4 to a remote server 5, for example a cloud server, over a network such as the Internet 6. The server 5 includes a storage 50 with a database such as a SQL database, a set of XML documents, a set of images of light field data, etc, for storing a collection of reference light field data and/or one or a plurality of global models, and a processor 51, including a microprocessor with computer code for causing the microprocessor to perform the operations needed in the annotation method. The annotations and corresponding positions can also be stored in storage 50 along with the reference light field data.

The program code executed by the user device 4 could include for example an application software, or app, that can be downloaded and installed by the user in the user device 4. The program code could also include part of the operating code of the user device 4. The program code could also include code embedded in web page or executed in a browser, including for example Java, Javascript, HTML5 code, etc. The program code may be stored as a computer program product in a tangible apparatus readable medium, such as a Flash memory, a hard disk, or any type of permanent or semi-permanent memory.

The program code is executed by the microprocessor 400 in the user device 4 for causing this microprocessor to send at least some of the captured data sets corresponding to light fields, or features of those data sets, to the remote server 5. The program code is arranged for sending this light field data in a "plenoptic format", i.e., without losing the information about the direction of the light rays. The program code can also cause the microprocessor 400 to receive from the server 5 annotated data in a light field format, or annotated images, or annotations related to the previously sent light field data, and for rendering a view corresponding to the captured data with annotations.

In one embodiment, the program code in user device 4 also includes a module for identifying local features present in the captured data, and for computing a description of this local feature, for example a binary vector that the program code can cause to send to the remote server 5.

The program code executed by the microprocessor in the server 5 may include executable programs or other codes for causing the server 5 to carry out at least some of the following tasks:

receiving from a device data representing a light field;
retrieving a model and/or a plurality of reference data in plenoptic format;
matching the data received from the user device with one part of said model, respectively with one among a plurality of reference data,
determining an annotation associated with the model respectively with one among a plurality of reference data;
sending to the device an annotation, an annotated image or annotated data, that corresponds to the received data.

In a various embodiment, instead of sending the captured data sets to a remote server for matching with reference data in the server, this matching could be done locally with a set of locally stored reference data or with a model locally stored in the user device.

We will now describe various possible embodiments of a method that can be carried out with the systems, apparatus and arrangements of FIGS. 1-4.

A. Multiple Independent Reference Data Sets Based on Plenoptic Local Features

In an embodiment, a collection of already known and previously captured reference data sets representing light fields is available in storage 50 of server 5, for example a collection of reference data previously captured with a plenoptic camera or converted from a 3D model. In this case, before being able to do a proper registration, a matching data has to be recognized from the set of reference data. It's only afterward that the registration with the matching reference data takes place.

Figure 5:
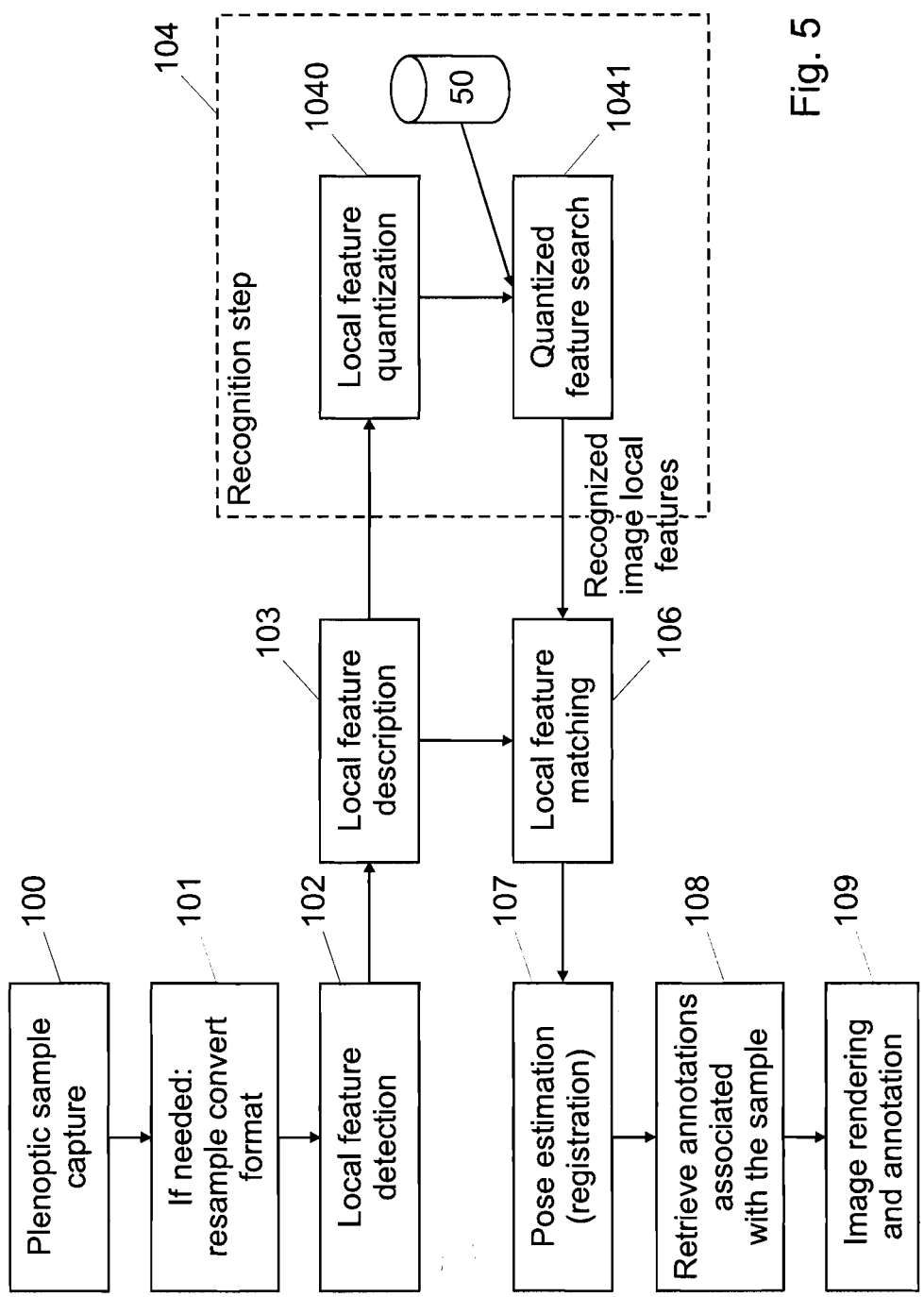
FIG. 5 is a block diagram of a method for capturing data representing a light field, and rendering an annotated 2D image.

A possible series of steps used in this embodiment is illustrated on FIG. 5. It comprises:

Step 100: The light field to be annotated is captured with a plenoptic camera 41 in a user device 4, or retrieved from any possible source of light field data. A 2D projection of the captured plenoptic light field may be displayed on a 2D display 40 of the user device 4, but the data is preferably stored as light field data, i.e., without losing the information about the direction of incoming light rays on each sub-image.

Step 101: If the plenoptic camera used for capturing the reference data is not of the same type than the plenoptic camera used for capturing the light field data to annotate, the process may include a step 101 of converting or resampling either one of the data into the format of the other. For example, different plenoptic cameras may generate light field data having different number of pixels in each sub-image, or sample the light field in different manners. This conversion could be made in the user device 4 and/or in the remote server 5.

Step 102: Detection of local features in the captured data. The detection can be made for example by following a DPF (depth plenoptic feature) algorithm, by using the disparity information contained in the light field, or by representing the light field in an epipolar volume, as will be described later. Other method of detections and other type of local features may be used. The type of local features used, and the method of detection, may depend on the scene, location, user's choice, etc.

Step 103: Description of those local features detected in the captured data. Depending on the type of local features that were detected during the previous step, different type of descriptors could be used, including for example binary vectors, or other descriptors better adapted to the description of disparities or local feature points in an epipolar volume, as will be described. The detection and description of local features is advantageously made by suitable software modules in the user device 4, which only needs to send those short descriptions to the server 5. It is also possible to send the complete light field data to the server 5 that will then detect and describe the local features, but this would result in less efficient use of available bandwidth.

Step 104: Recognition of the captured data based on the described local features. This can be done in different ways. In one embodiment, one can quantize the local features (step 1040) and then use this quantized features to search during step 1041 for reference data with the same (or about the same) set of quantized features. The reference data may be retrieved from the user device, and/or from a remote storage 50 in the remote server 5. A pre-filtering of reference data may be made based on various filtering criteria, such as the location of the user device 4 previously determined from a satellite or terrestrial localization system, a signal received from the scene, user's selections, etc. The reference data might include 2D images, 3D models, or preferably data representing light fields. This step may be executed by suitable program code in the server 5, although a local recognition in the user device 4 is possible if the number of reference data is not too high.

The quantization step 1040 allows to more easily scale the system if the number of known references grows.

Step 106: Matching of the detected local features in the captured data with the ones in the reference data identified during the previous step. The local features in the reference data are detected and described in a previous phase when the collection 50 is constituted. This step may be executed by suitable program code in the server 5, but may also be carried out in the user device 4.

Step 107: Finding a geometric transformation which maps the detected local features from the captured data into the matching reference data. This step is called 'registration'. The transformation may include warping of the captured data using rotation, scaling, translation or homography. If several reference images are available, this step may comprise a determination of the reference data where the quality of the registration is best. The registration may occur in the user device 4, in the remote server 5, or partly in the user device and in the remote server.

In one embodiment, the result of the registration process also indicates the full position of the user device 4 capturing the scene with respect to the information to be displayed as the 'augmented layer'. The camera position and orientation may be identified by 6 parameters: 3 for the position and 3 for its orientation.

This step may be executed by suitable program code in the server 5, but may also be carried out in the user device 4.

Step 108: Retrieving at least one annotation associated in the collection 50 with the reference data, as well as a position or feature of the image to which the annotation should be associated.

Step 109: Rendering on the display 40 of user device 4 a view, such as a 2D or 3D image, based on the captured data with at least one of the annotations retrieved during the step 108.

B. Global Reference Data Set Based on Plenoptic Local Features

The above mentioned method A relies on a collection of reference data representing different light fields, and a process of determining, based on local features, the reference data that matches the reference data with the highest accuracy or confidence.

We will now describe a global method which does not rely on the availability of a collection of reference light field data, but uses a global model of a scene. The method still uses local features for matching and registration of the captured data with this model. This kind of method is helpful in the case of an outdoor localization for example, but could also be used within buildings, museums, malls, etc, or for other augmented reality applications where a model of the whole scene is available.

The global model may be constituted by a cloud of local features computed on a set of light field data captured with one or a plurality of plenoptic cameras. For example, a model of a city or of the reference scene may be built by aggregating a large set of light field data captured with various cameras. Local features are detected in these various pieces of data and described. Those described features are then assigned to a specific physical location in a global coordinate system. At the end, the model is thus made of a cloud of local features, each representing a specific physical location in the global coordinate system. In the case of city, the coordinate system could be for example the one used in GPS (WGS84) and all the features could represent a specific point/local area in that coordinate system.

Alternatively, the model is not made of plenoptic local features extracted from plenoptic samples. For example, we can have the 3D model of a city whereas the query would be plenoptic samples. In that case, a possibility would be to render synthetic light field data from the 3D model. Another possibility would be to use a mutual information measure between the two data modality in order to apply a minimization process where the geometric transformation mapping the input plenoptic image onto the 3D model would be optimized with respect to the mutual information measure.

Figure 6:
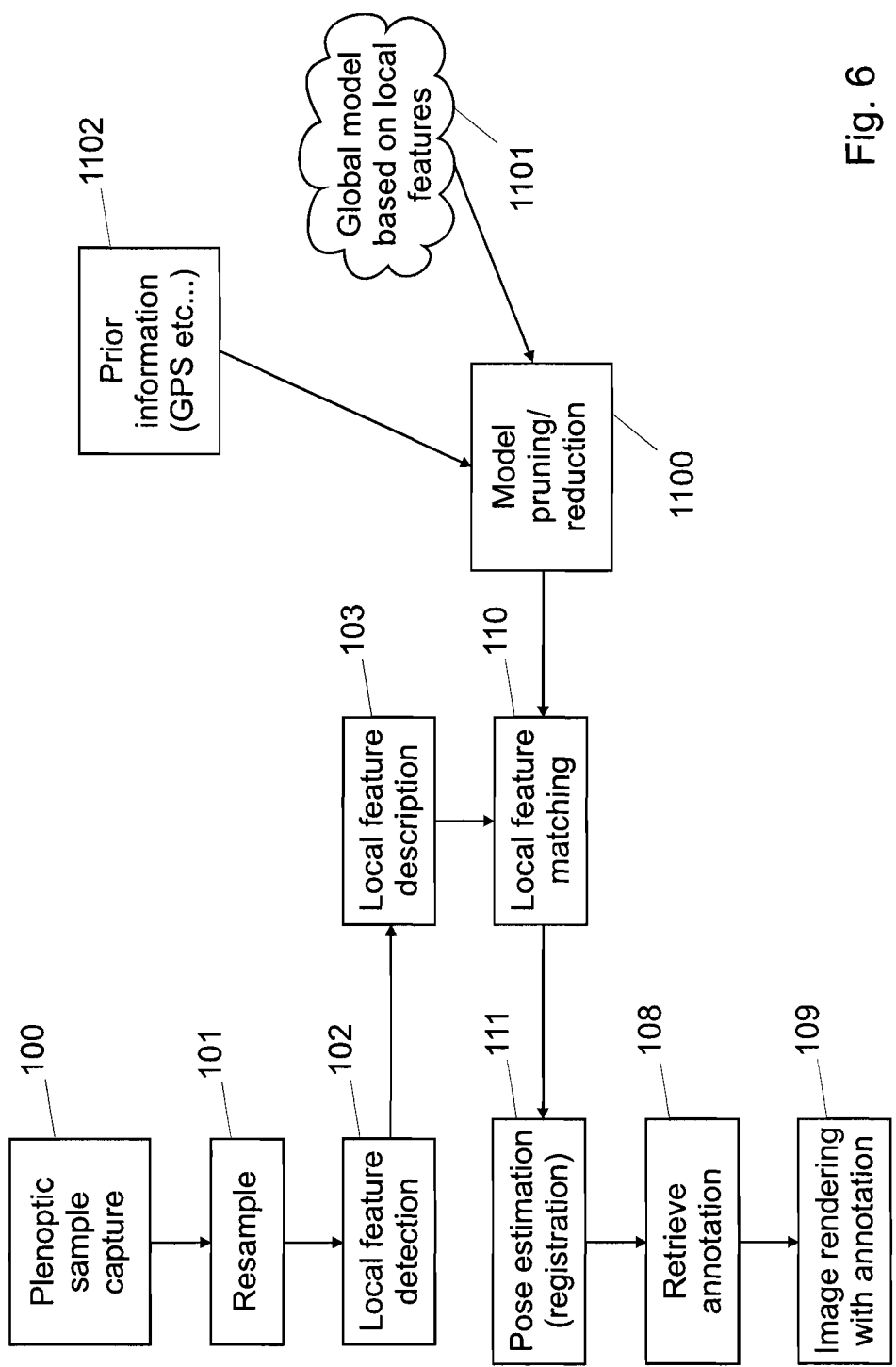
FIG. 6 is a block diagram of a method of a local registration method with a global model.

In order to match a newly captured data captured with a plenoptic camera 41 in a user device 4 against this cloud of local plenoptic features, the following approach illustrated with FIG. 6 may be used:

Step 100: Capture or retrieve data representing a light field to be annotated.

Step 101: If needed, resample the data.

Steps 102-103: Detect and describe local features in the captured data representing a light field.

Step 110: Match the detected local features with the ones of the global model 1101, for example a model stored in database 50. This matching can be speeded up by binning the features together to accelerate the search. A pruning step 1100 may be performed, based on prior information 1102 (GPS information, user input, etc), in order to speed up the matching. The matching is then only done on a subset of the local features, corresponding to these prior information. A locality sensitive hashing method may be used, where a set of hash functions is computed on the feature descriptors in order to create clusters based on the different hash values. The set of hash functions is chosen such that two descriptors, which are close together in the descriptor space, produce the same hash value.

Step 111: Compute a geometrical transformation projecting the local features detected in the captured data with the local features matched in the global model. This is the registration step. The output of this step is the pose estimation of the camera 41 so that we know where the camera capturing the captured data is with respect to the model coordinate system.

Step 108: The annotations are then retrieved. The annotations are usually position-dependent and are themselves registered within the model coordinate system.

Step 109: An image with annotations is rendered.

Again, the use of the plenoptic information improves the robustness of the matching and registration process, notably under different illumination conditions, image deformation and so on.

C. Global Registration Based on Light Field Data Using a Global Model

We will now describe a further method of registration based on a global registration with a global model. As the former method B, this method could be used when a known global model of a predefined scene is available. For example, in the case of a city, we can have the a-priori information that we are in a given city and therefore load a 3D model of the city already available. The registration process delivers the position of the camera having captured a light field data with respect to the model coordinate system.

Figure 7:
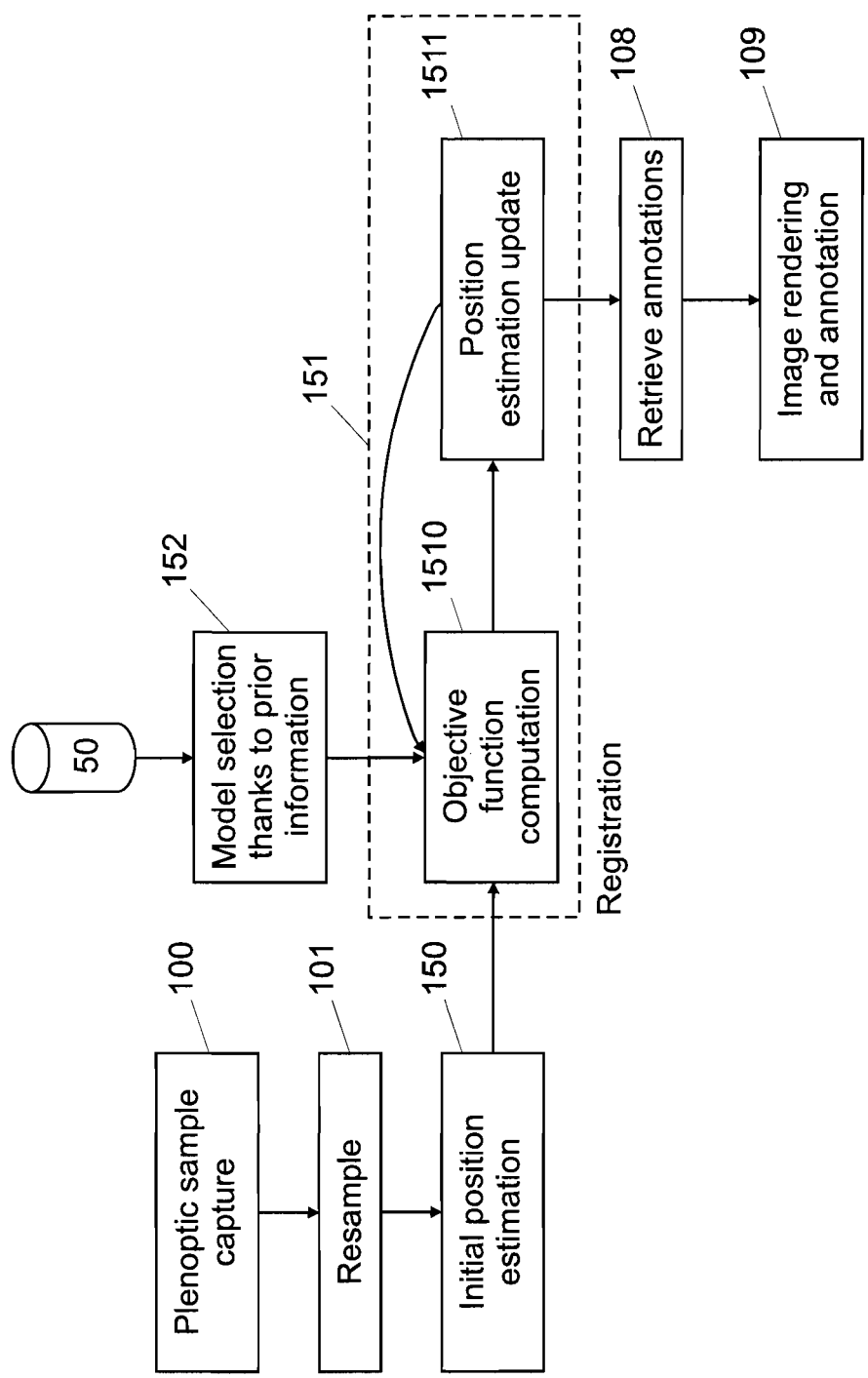
FIG. 7 is a block diagram of a global registration method in the plenoptic space.

As an example, a typical method based on global registration could contain following steps illustrated with FIG. 7:

Step 152: A global model of the scene or environment the user is currently in is loaded during step 152 in the memory of the user device 4, for example in his smartphone or tablet or navigation system comprising a plenoptic sensor 2. The model which is loaded from storage 50 may depend on the user's location, as determined for example with a GPS, on user's selection, on an automatic analysis of the scene, on other a priori known information, etc.

Step 100: The light field to be annotated is captured with the camera 41 of the user device 4. A 2D projection of the captured plenoptic light field may be displayed on a 2D display 40 of the user device 4, but the data is preferably stored as light field data, i.e., without losing the information about the direction of incoming light rays on each pixel.

Step 101: The process may include an optional step of converting or resampling the captured data to ease or speed the matching and recognition process, for example if the model has a different format. For example, different plenoptic cameras may generate data having different number of pixels in each sub-image, or sample the light field in different manners. This conversion could be made in the user device 4 or in the remote server 5.

Step 150: The initial position may be estimated, for example based on a GPS, on information entered by the user, or other similar prior information.

Step 151: The captured data is registered with respect to the model. At the output, we will have the full six degrees of freedom for the position of the camera with respect to the model. If the model has been loaded in the user device 4, the registration could be made by the processor in this device.

Step 108: A set of annotations associated with a location around the computed device 4's position, or which should be visible from this position, is retrieved from the model.

Step 109: A view is rendered on the display 40 of the user device 4, such as a 2D or 3D image, based on the captured data with at least of the annotations retrieved during the previous step.

The registration step 151 of the above global registration method preferably uses an objective function to, given a camera position estimate, compute the error of projecting the plenoptic light field sample into the model (in the above case, a city model). With this objective function (also known as cost function), an iterative optimization process can be applied so that the camera position estimate is refined and improved in order to minimize the projection error. This optimization process can be break down into those steps:

1. Get/compute an initial estimate of the position of the user device. This can be done for example, in the case of a smartphone containing a plenoptic camera, by using the smartphone GPS, accelerometers and compass to compute the device position and orientation. Set this initial estimate as the current estimate.
2. Compute the projection of the input plenoptic sample into the model. Using the objective function, compute the projection error (step 1510).
3. Given the error and the objective function, compute the next camera position estimate (step 1511) and set it as the current estimate
4. If the error is more than a specific threshold, go back to step 2, otherwise go to step 5.
5. The current estimate is the optimized position of the user device and corresponds to the real position of the device with respect to the model.

As we are using data representing the light field, we can tailor the objective function used in step 1510 so that it uses all the information present in that data set, making the registration more robust than when standard 2D images are used.

An objective function especially tailored for a plenoptic input sample can be derived so that the registration is more robust against all kinds of transformation and illumination conditions. In the case where a plenoptic model is not available, one possible approach is to generate a plenoptic synthetic sample from the 3D model. This sample can be generated by simulating a virtual plenoptic camera and doing the process of ray-tracing on the different 3D model points. Each point of the 3D model might be represented with 3D coordinates as well as with physical properties such as reflectance or transparency. Light sources of the scene may be described as well in order to obtain a realistic 3D scene. If the scene light sources are missing, the lighting can be considered as ambient, and therefore affecting each object of the scene equally. The ray-tracing method will then involve a reconstitution of the ray paths in space so as to simulate real light rays traveling in the scene. In presence of light sources, the rays are traced starting from those sources are propagated on the objects of the scene. In the case where ambient lighting is considered, rays are directly generated from the physical points of the 3D model. Reflection, refraction, scattering or dispersion are parts of the optical effects that can be simulated by ray tracing in order to ensure good realism of the scene rendering.

To simulate the light field hitting a plenoptic camera sensor, a virtual plenoptic camera can be placed in the virtual scene. All rays entering the camera main lens can then be virtually projected onto the virtual sensor to create a plenoptic reference data corresponding to the 3D model.

After having retrieved this plenoptic reference data, one can determine the viewpoint of the camera where the correlation between ray intensities in the reference data and in the captured data is maximal. Other objective functions could be used for determining the most likely viewpoint of the camera in the model.

Detection and Description of Local Features

Both methods A and B aim at reducing the space of registration to only specific, therefore local, features of the data which are truly informative, i.e. their entropy is high compared to other areas of the space. Moreover, the mutual information, i.e. relative entropy, between two local features aims to be low so that if two local features represent two different areas, they can be easily differentiated from each other. The last desirable property of those features is that, given two views of the same scene, we can detect the same features, whatever the transformation between those two views (geometric transform, exposure changes etc. . . . ) is.

According to one aspect, the kind of local features used for the registration and recognition is selected in function of the type of scene. For example, in a natural panoramic view, we don't use the same feature as in a city at a street-level. In the first case we could use the horizon line as a feature whereas, in the second case, an appropriate feature would be points where several different kind of depth are crossing those points.

WO2012084362, the content of which is herewith enclosed by reference, describes an augmented reality method where the algorithm depends on the scene. However, this document does not suggest adapting the type of local features used for registration to the type of scene. Methods similar to the ones described in WO2012084362 can be used in the apparatus and methods described herein for determining the type of local features to use in function of the type of scene, determined for example from the device's location, analysis of image, user's selection, received signal, etc.

First Example of Local Features

Depth Plenoptic Features (DPF)

In one embodiment, the local features used for registration of the captured data include intersection of planes.

Pictures in an urban environment or images of manufactured objects such as mechanical parts, for example, often contain a high number of man-made structures, which are usually highly regular in term of geometry and are usually poorly textured. In those areas, points at which multiple planes intersect would typically represent corners in 3D. Therefore, in such a man-made scene, feature points may be defined as areas where a minimum number of planes intersect.

The detection of this type of features can be efficiently and precisely done by exploiting all the information present in the captured data in a light field format.

In the data delivered by a plenoptic sensor in a plenoptic camera 41 (FIG. 4), different pixels of a sub-image correspond to light beams coming various incidences onto the micro-lens 20, i.e., from objects at different distances. Therefore, areas where objects are in focus in different focused plane are easy to detect as sub images where several adjacent pixels have the same, or approximately the same value.

Therefore, a set of pixels taken from different sub images is retrieved in order to create images focused at different depth without depth field computation or other computation intensive tasks. We can define Depth Plenoptic Features as areas where physical points at different depths are simultaneously present, and use those features for registering the captured data with the reference data.

Consider a stack with different projections of a light field at different focus distances. If we take one image of this stack, an object in focus will be less in focus on the previous image. The same holds for the next image. Therefore, we can compute a 3D gradient on this stack. Areas where the gradient magnitude is high correspond to highly focused objects/pixels. Areas where this gradient magnitude is low correspond to objects present at different depths, which could be detected and used as high entropy features for registering the captured data. Therefore, this in-focus detection technique coupled with the plenoptic camera ability to provide different focused information for the same physical area result in highly informative and repeatable features.

This method of detecting local features may thus for example include detection of areas in the data that correspond to planes nearly parallel to the line of sight and where the 3D gradient of the stack is low, corresponding to identical objects present at different depths. The method may also include detection of areas in the data that correspond to planes nearly perpendicular to the line of sight so that adjacent pixels have a similar value. The method of detecting local features may include a detection of intersection between planes which are nearly parallel to the line of sight with planes which are nearly perpendicular to the line of sight.

More generally, the detection of local features can include a detection of areas in the plenoptic light field where pixels corresponding to a specific depth have a predefined relationship with pixels of the same sub image at a different depth. For example, a high entropy or high frequency in the depth direction (parallel to the line of sight) may also be considered to be a useful feature for registration.

Second Example of Local Features

Local Features Based on Disparities

In one embodiment, the local features used for the identification of the captured plenoptic light field use the disparity information contained in the light field.

The disparity of a physical point is the displacement between two projections of that point onto one plane. In a typical visual system, the disparity is computed as corresponding to the difference in positions for a same physical point projected from two different views on the same image plane.

The displacement of the projection of a point from two different views is related to the depth of that point with respect to the plane on which it is projected. A point being at a certain distance from the camera plane will have a higher disparity (displacement) value than one further away from the plane: the closer to the plane an object is, the bigger its disparity value. As a consequence, the depth is inversely related to the disparity value.

Since the capture of the plenoptic light field includes the information of positions and directions of the light rays coming from physical points, it is possible to extract different rays coming from the same physical point and corresponding to different views. Sub-image pixels associated to these rays can then be used to compute the disparity and depth information.

The information of depth can then be associated with local features to improve the robustness of the identification and matching.

In one embodiment, depth information can be used as a mean to cluster points into an object lying at a specific depth. This embodiment is particularly interesting in the case of urban scenes or manufactured objects often containing a significant number of man-made structures being geometrically regular. Indeed, planes are frequent in such man-made environment. Clusters then represent planes at specific depth perpendicular to the line of sight of the camera.

Matching is made more robust using the clusters. Indeed, instead of just having constraints on single local features, we can match together groups of features. Matching of these clusters is more constrained than only with local features and therefore yields better results.

Clustering the keypoints also has the advantage of discarding meaningless, isolated features that do not belong to any cluster. It reduces the number of features necessary for the matching of one scene and as a consequence is more adapted to a system where large annotations or many captured images need to be matched.

Third Example of Local Features

Epipolar Volume Form

In one embodiment, epipolar volumes and more specifically lines in those volumes, called epipolar lines, are used to detect meaningful and stable local feature points. The epipolar lines could be combined with other feature detector such as Harris affine feature region detector. Representing a plenoptic light field sample as an epipolar volume form is of great interests as it simplifies and speeds up a number of analysis of the plenoptic volume. Epipolar volumes are created by stacking images together where the movement of the camera between two images is only a horizontal translation. Analysing these volumes yields to the following conclusion: lines present on these volumes may represent a single physical point. Therefore the slope of the line also defines the depth of that point.

Therefore, in one embodiment, local features in the light field data are determined and projected in the epipolar volume space. In that space we cluster the point into lines and retain only a single local feature point per line, while filtering two short lines in order to remove non-stable features. At the output we have a set of stable local features as they are detected under different viewpoints.

Description of Local Features: Binary Plenoptic Feature Descriptor

The description of local features (for example in step 103 of FIG. 5) could be done in a binary form. Not only does this considerably reduce the descriptor size of each feature but it also speeds up the comparison as we can use the Hamming distance in order to compare two features together, in order to see if they are similar or not. Indeed, the Hamming distance can be efficiently computed using specialized vector instructions, which compute the distance for several bytes at once.

The above mentioned DPF features can be described with a descriptor that exploits information from a gradient operator. A faster method is to perform pixel value comparisons in order to describe the detected features. This can be seen as a simplified version of the gradient operator. These comparisons of pixel values are done around previously detected feature points so that they keep the desired repeatable and informative nature of such descriptors. The result of a single comparison corresponds to a 1 bit long information. By doing multiple comparisons, this results in a bit-string descriptor, where each bit corresponds to a specific comparison.

This principle of binarized descriptor can be used in the plenoptic space, by exploiting all the information of the plenoptic light field data, yielding to a plenoptic binary descriptor. In the case where images would be produced by a standard pin-hole camera, the comparison of pixel values would correspond to comparing the visual information of the image. In the plenoptic camera case, the comparisons are done in different dimensions in order to maximize the entropy of the descriptor.

As seen before, a plenoptic image is composed of several sub-images. A single sub-image contains several representations of the same physical point under different viewpoints. Therefore, in a plenoptic binary descriptor, this redundancy of information is exploited. When this plenoptic binary descriptor is coupled with the afordescribed DPF detector, the focal stack exploited by the detector can also be used as a source for comparison points. Therefore the plenoptic binary descriptor contains both information about different views of the area and information about the different depths of this feature area.

The plenoptic binary descriptor is then computed by choosing a set of comparison point pairs. A part of those pairs corresponds to pixel value locations taken from sub-images located around the feature point area detected by the DPF detector. The other part corresponds to points located around the feature point area but at different depths in the focal stack of the DPF detector. This set of pairs is chosen only one time and the same is used for all descriptor computations.

There are different strategies to pick this comparison points set. The first one is to randomly pick in the wanted space, which can be either the focal stack or a sub-image. While this works reliably well, machine learning can be also used in order to learn the best set and to maximize the inter-distance between different features while minimizing the intra-distance between the same features. For a moderate size of feature area, a search based on a greedy algorithm of the best comparison points is performed in order to maximize the variance of the descriptors while minimizing their correlation.

In order to compute a binary descriptor representing a given feature area, the following procedure could be applied:
1. For each comparison points pair, decide if the rendered grayscale pixel value at the first comparison point is less than at the other point.
2. If the comparison is true, then a binary '1' is appended to the descriptor (which is initially empty), otherwise a binary '0' is appended.
3. The procedure is repeated for each comparison points, creating a binary string descriptor.

Using those techniques, the so determined binary descriptors of the captured data can be compared with the binary descriptors of the reference plenoptic light field. This comparison may be based on a Hamming distance in order to determine their relative distance in this plenoptic feature space.

From Registration to the Augmented Scene

After registration with any one of the above methods, the position and orientation of the plenoptic camera 41 in the user device 4 relatively to the registered reference scene is known. The reference data corresponding to the captured data is also known, and associated in a reference database with a set of annotations for different elements or features of the data. Annotations might consist of text, images, videos, sounds, manipulations or highlighting of existing features, 3D objects . . . . They depend on the context of the scene and the view to be annotated.

The final augmented (annotated) image is then rendered. For instance, a 2D image (still or video) could be generated showing a captured landscape with the names of the mountains or other annotations superimposed over the image. Or in urban environment, directions to the nearby stores and amenities could be displayed over the image.

In one embodiment, the rendering of the view (objects in focus, viewpoint of the camera) takes place before the integration of the annotations. Therefore, knowing the pose for a given rendered view as well as the position of the annotations in the model, we can project them in the view that we chose to render.

Augmented Reality Plenoptic Rendering and Applications

Capture of a scene in the plenoptic space opens doors to new possibilities regarding augmented reality rendering. Indeed, since the positions and directions of light rays hitting the sensor in the plenoptic camera allows among other features to retrieve information of depth, refocus after the image has been captured or change the user point of view, we can take advantage of this information to enhance the scene rendering and offer users a new experience. We describe in the following paragraphs some possible advanced rendering capabilities.

Indeed, one particular interest of augmented reality relates to the fact that users can interact with elements of the image rendered by the process, for instance by clicking on features of interest in order to get some related extra information. These interactions are particularly interesting since users, instead of being passive, can be brought to directly interact with objects, real or virtual.

For instance, it is often desirable to tell users which particular objects of a rendered image are interactive and associated with annotations, and therefore, that they can for example click on it. One way to solve this problem is to display notifications, e.g. a textbox with an arrow pointing to the object. However, if several interactive objects are part of a captured scene, there will need to be many notifications telling the users what the interactive elements are.

The plenoptic space allows new interactive elements, which would contribute to a better user experience. As previously stated, data captured by plenoptic sensor have the capabilities to be rendered as 2D images with different focus distances after the data has been captured. Also, the refocusing process can be independently computed for local parts of the data and not necessarily considering the data as a whole. In other words, it means that specific objects of an image can be brought to focus, even if these objects do not belong to the same depth in the scene.

Therefore, the annotated objects or features of an annotated image can be rendered so that they are in focus, while the remaining elements of the scene are made blurry. This way, users can immediately notice what are the annotated or interactive objects of the image and which ones are not.

As an example, an interactive augmented reality manual or video tutorial could be conceived where different knobs or parts of a printer contain useful instructions displayed in augmented reality upon user selection. A 2D annotated image may be rendered from the plenoptic light field that will show the printer and make all its interactive knobs or parts in focus, while the rest of the image will be blurred. Therefore, the user will be presented with the interactive parts of the printer, which he could click to get access to the annotations. The user may also change the depth of focus if he wants a focused view of other elements.

The change in view point of plenoptic cameras gives the possibility to render each point of a scene as a partial 3D element. The 3D reconstruction is only partial, as rays coming from the scene are captured from one position and not from all positions around the objects. However, this partial 3D reconstruction makes it possible to render objects in the scene with a swinging/jittering movement. These objects appear as 3D objects seen from a particular direction and popping out from the image. Again, this effect can be computed locally for selected objects of the scene. Therefore, the interactive elements of a scene can be displayed as moving objects, and thus attracting the user attraction, while the other objects stay still. These swinging elements can then be clicked by the user to trigger the display of annotations content.

The various operations of methods described above may be performed by any suitable means capable of performing the operations, such as various hardware and/or software component(s), circuits, and/or module(s). Generally, any operations described in the application may be performed by corresponding functional means capable of performing the operations. The various means, logical blocks, and modules may include various hardware and/or software component(s) and/or module(s), including, but not limited to a circuit, an application specific integrate circuit (ASIC), or a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. A server may be implemented as a single machine, as a set of machine, as a virtual server, or as a cloud server.

As used herein, the expression "light field data" designates any data generated with a plenoptic camera, or computed from a 3D model as if it would have been captured with a plenoptic camera, and describing a light field image of a scene, i.e., an image where not only the brightness and color of the light is stored, but also the direction of this light. A 2D or 3D projection rendered from such a plenoptic light field image is not considered to be a plenoptic light field image, since this direction of light is lost.

As used herein, the expression "plenoptic space" may designate a multi-dimensional space with which a light field, i.e., a function that describes the amount of light in every direction in space or that reaches a sensor, can be described. A plenoptic space may be described by at least two parameters for the position of each sub image, and at least one additional parameter for the direction of the light that reaches this sub image. Frequently a plenoptic space is described by two parameters for the position of each sub image, two parameters for the direction of the light onto that sub image, at least one parameter for the wavelength, and possibly one parameter for the time (in case of video).

As used herein, the term "annotation" encompasses a wide variety of possible elements, including for example text, still images, video images, logos, image layers, sounds and/or other elements that could be superimposed or otherwise added to an image.

As used herein, the term "pixel" may designate one single monochrome photosite, or a plurality of adjacent photosites for detecting light in different colors. For example, three adjacents for detecting red, green and blue light could form a single pixel.

As used herein, the term "determining" encompasses a wide variety of actions. For example, "determining" may include calculating, computing, processing, deriving, investigating, looking up (e.g., looking up in a table, a database or another data structure), ascertaining, estimating and the like. Also, "determining" may include receiving (e.g., receiving information), accessing (e.g., accessing data in a memory) and the like. Also, "determining" may include resolving, selecting, choosing, establishing and the like.

Capturing an image of a scene involves using a digital camera for measuring the brightness of light that reaches the image sensor of the camera. Capturing light field data may involve using a plenoptic camera, or may involve generating the light filed data from a 3D model or other description of the scene and light sources.

The expression "rendering a view", for example "rendering a 2D view from light field data", encompasses the action or computing or generating an image, for example computing a 2D image from the information included in the light field data. Sometime, the expression "projecting a view", for example "projecting a 2D view based on the light field data" is also used to insist on the fact that a plurality of different views may be rendered.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A software module may consist of an executable program, a portion or routine or library used in a complete program, a plurality of interconnected programs, an "apps" executed by many smartphones, tablets or computers, a widget, a Flash application, a portion of HTML code, etc. A storage medium may be coupled to a processor such that the processor can read information from, and write information to, the storage medium. In the alternative, the storage medium may be integral to the processor. A database may be implemented as any structured collection of data, including a SQL database, a set of XML documents, a semantical database, or set of information available over an IP network, or any other suitable structure.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An annotating method for adding one or more annotations to data which represent a light field, comprising the steps of:
    capturing data representing a light field with a plenoptic camera in a device;
    matching, using a processor, the captured data with reference data;
    retrieving from a memory, using the processor, an annotation which is associated in the memory with an element of said reference data, wherein said annotation is information related to the element;
    adding, using the processor, said retrieved annotation to said captured data, so as to render a view in which said captured data is shown with the retrieved annotation associated with an element shown in the captured data which corresponds to said element of said reference data;
    wherein since said captured data was captured with a plenoptic camera more robust matching of said captured data with reference data is achieved, thereby providing for more reliable annotation of element(s) shown in said captured data.

2. The method of claim 1, wherein said reference data represents a reference light field.

3. The method of claim 2, including the step of generating said reference data from a 3D model of said scene.

4. The method of claim 2, wherein said step of matching includes matching said captured data with one piece of data among a plurality of pieces of reference data, each of the plurality of pieces of reference data representing a different light view.

5. The method of claim 1, further comprising a step of detecting local features in said captured data.

6. The method of claim 5, wherein said step of detecting local features includes detecting areas where pixels corresponding to a first depth of the light field have a predefined relationship with pixels corresponding to a different depth of the light field.

7. The method of claim 5, wherein said step of detecting local features includes detecting disparities in the captured data.

8. The method of claim 5, wherein said step of detecting local features includes computing epipolar volumes or lines.

9. The method of claim 5, comprising a step of describing said local features.

10. The method of claim 9, said local features being described with descriptors in a binary form.

11. The method of claim 10, comprising a step of computing a Hamming distances between said descriptors.

12. The method of claim 5, comprising a step of matching said local features in said captured data with local features in said reference data.

13. The method of claim 12, comprising a step of selecting one or more limited number of pieces of reference data depending on the position of said device, on a selection made by the user, or on a received signal, prior to said matching.

14. The method of claim 5, comprising a step of computing a descriptor of said local features in said captured data, and comparing said descriptor with a descriptor of local features in said reference data.

15. The method of claim 5, comprising a step of registering said plenoptic data with said reference data, using said local features.

16. The method of claim 5, comprising a step of detecting a type of scene and determining a type of local features to detect depending on said type of scene.

17. The method of claim 1, said reference data including a global model of a scene.

18. The method of claim 17, comprising a step of minimizing a cost function representing the error of projection of said captured data onto said reference data.

19. The method of claim 1, said step of rendering a view including rendering a 2D view from the captured data, and superimposing annotations on the 2D view.

20. The method of claim 19, said step of rendering a 2D view from the captured data including displaying annotated objects or features of an annotated image so that they are in focus, while the remaining elements of the scene are made blurry.

21. A computer program product comprising a non-transitory tangible apparatus readable medium for causing said processor to carry out the method of claim 1.

22. An annotating method comprising the steps of:
    capturing data representing a light field with a plenoptic camera;
    sending data by a processor, to a remote server;

matching the captured data with reference data;
retrieving from a memory, by the processor, annotations or annotated images which are associated in the memory with an element of said reference data, wherein said annotation is information related to the element;
adding, using the processor, said retrieved annotations or annotated images to said captured data, so as to render a view in which said captured data is shown with the retrieved annotations or annotated images associated with an element shown in the captured data which corresponds to said element of said reference data;
wherein since said captured data was captured with a plenoptic camera more robust matching of said captured data with reference data is achieved, thereby providing for more reliable annotation of element(s) shown in said captured data.

23. The method of claim 22, wherein said step of sending data to a remote server includes sending captured data in plenoptic format to said remote server.

24. The method of claim 22, comprising a step of computing a descriptor of local features in said captured data, and wherein said step of sending data to a remote server includes sending said descriptor to said remote server.

25. The method of claim 24, wherein said step of computing a descriptor includes detecting areas where pixels corresponding to a first depth of the light field have a predefined relationship with pixels corresponding to a different depth of the light field.

26. The method of claim 24, wherein said step of computing a descriptor includes detecting disparities in the captured data.

27. The method of claim 24, wherein said step of computing a descriptor includes computing epipolar volumes or lines.

28. An annotating method comprising the steps of:
retrieving data representing a light field, wherein said data comprises plenoptic information;
executing at a processor, for registering the retrieved data with one reference model or with one among a plurality of pieces of reference light field data;
retrieving annotations at the processor, associated in a memory with said reference model or with said one among a plurality of pieces of reference light field data, wherein said annotation is information related to an element of the reference model or reference light field data,
adding, using the processor, said retrieved annotations to said data representing a light field, so as to render a view in which said data representing a light field is shown with the retrieved annotations associated with an element shown in the data representing a light field which corresponds to said element of said of the reference model or reference light field data;
wherein since said data comprises plenoptic information more robust registering of said retrieved data with said one reference model or with one among a plurality of pieces of reference light field data is achieved, thereby providing for more reliable annotation of element(s) shown in said data representing a light field.

29. The method of claim 28, comprising a step of retrieving local features in the retrieved data.

30. An apparatus for capturing and annotating data corresponding to a scene, comprising:
a plenoptic camera for capturing data representing a light field;
a processor;
a display;
wherein said processor is configured such that it can, match data captured by the plenoptic camera with reference data;
retrieve, from a memory, an annotation which is associated in the memory with an element of said reference data, wherein said annotation is information related to the element;
add said retrieved annotation to said captured data, so as to render a view in which said captured data is shown with the retrieved annotation associated with an element shown in the captured data which corresponds to said element of said reference data;
wherein since said captured data is captured with a plenoptic camera the processor can perform more robust matching of said captured data with reference data, thereby providing for more reliable annotation of element(s) shown in said captured data.

31. The apparatus of claim 30, said processor further detecting local features present in the captured data.

32. The apparatus of claim 30, said processor further arranged for describing each detected local feature with a binary vector.

33. An apparatus for determining annotations, comprising:
a processor;
a store;
wherein said processor receives data representing a light field the data comprising plenoptic information, to match said data with one reference data in said store, determines an annotation associated in said store with said reference data the annotation being information related to an element of the reference data, and sends said annotation to a remote device,
wherein since said received data comprises plenoptic information the processor can perform more robust matching of said data with reference data, thereby providing for more reliable annotation of element(s) shown in said data representing a light field.

34. An annotating method comprising the steps of:
a) capturing data representing a light field to be annotated with a plenoptic camera in a device;
b) executing by a processor, for matching the captured data with reference data;
c) executing by the processor, for registering the captured data with respect to reference data;
d) executing by the processor, for retrieving an annotation associated in a memory with an element of said reference data, the annotation being information related to an element of the reference data;
e) executing by the processor, for adding said retrieved annotation to said captured data, so as to render a view in which said captured data is shown with the retrieved annotation associated with an element shown in the captured data which corresponds to said element of said reference data;
wherein since said captured data was captured with a plenoptic camera more robust matching of said captured data with reference data is achieved, thereby providing for more reliable annotation of element(s) shown in said captured data.

35. A method of claim 34, comprising a step of computing a geometrical transformation mapping local features in the captured data with the reference data.

* * * * *